United States Patent
Koc et al.

(10) Patent No.: US 10,075,988 B2
(45) Date of Patent: Sep. 11, 2018

(54) DISCONTINUOUS RECEPTION (DRX) ALIGNMENT TECHNIQUES FOR DUAL-CONNECTIVITY ARCHITECTURES

(71) Applicant: Intel IP Corporation, Santa Clara, CA (US)

(72) Inventors: Ali T. Koc, Hillsboro, OR (US); Satish C. Jha, Hillsboro, OR (US); Kathiravetpillai Sivanesan, Richardson, TX (US); Rath Vannithamby, Portland, OR (US); Yujian Zhang, Beijing (CN)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/583,653

(22) Filed: Dec. 27, 2014

(65) Prior Publication Data

US 2015/0195867 A1    Jul. 9, 2015

Related U.S. Application Data

(60) Provisional application No. 61/924,194, filed on Jan. 6, 2014.

(51) Int. Cl.
*H04W 4/00* (2009.01)
*H04W 76/04* (2009.01)
(Continued)

(52) U.S. Cl.
CPC ......... *H04W 76/048* (2013.01); *H04W 76/28* (2018.02); *H04W 88/06* (2013.01);
(Continued)

(58) Field of Classification Search
CPC combination set(s) only.
See application file for complete search history.

(56) References Cited

U.S. PATENT DOCUMENTS 8,879,454 B2 * 11/2014 Yu ................. H04W 72/042
                                                    370/311
8,913,518 B2    12/2014 Heo et al.
(Continued)

FOREIGN PATENT DOCUMENTS

JP    20115199539 A    7/2011

OTHER PUBLICATIONS

International Search Report and Written Opinion received for PCT Patent Application No. PCT/US2015/010354, mailed Feb. 25, 2015, 9 pages.
(Continued)

*Primary Examiner* — Frank Duong

(57) ABSTRACT

Discontinuous reception (DRX) alignment techniques for dual-connectivity architectures are described. In one embodiment, for example, user equipment (UE) may comprise one or more radio frequency (RF) transceivers, one or more RF antennas, and logic, at least a portion of which is in hardware, the logic to receive a radio resource control (RRC) configuration information message containing a small cell RRC configuration information element (IE), the small cell RRC configuration IE to contain a small cell discontinuous reception (DRX) configuration IE comprising one or more inter-cell-coordinated small cell DRX parameters, the logic to determine a start time for a small cell DRX cycle based on at least one of the one or more inter-cell-coordinated small cell DRX parameters and initiate the small cell DRX cycle at the determined start time. Other embodiments are described and claimed.

24 Claims, 8 Drawing Sheets

(51) Int. Cl.
H04W 88/06 (2009.01)
H04W 76/28 (2018.01)
H04W 84/04 (2009.01)

(52) U.S. Cl.
CPC .......... H04W 84/045 (2013.01); Y02D 70/00 (2018.01); Y02D 70/1224 (2018.01); Y02D 70/1242 (2018.01); Y02D 70/1244 (2018.01); Y02D 70/1246 (2018.01); Y02D 70/1262 (2018.01); Y02D 70/1264 (2018.01); Y02D 70/142 (2018.01); Y02D 70/146 (2018.01); Y02D 70/166 (2018.01); Y02D 70/168 (2018.01); Y02D 70/21 (2018.01); Y02D 70/23 (2018.01); Y02D 70/24 (2018.01)

(56) References Cited

U.S. PATENT DOCUMENTS

| | | | |
|---|---|---|---|
| 9,084,264 | B2* | 7/2015 | Cai ............... H04W 52/54 |
| 9,603,038 | B2 | 3/2017 | Tseng |
| 9,723,556 | B2 | 8/2017 | Fan et al. |
| 9,801,232 | B2 | 10/2017 | Deenoo et al. |
| 2012/0140689 | A1 | 6/2012 | Pelletier et al. |
| 2012/0140743 | A1 | 6/2012 | Pelletier et al. |
| 2013/0242829 | A1 | 9/2013 | Ge et al. |
| 2014/0112271 | A1* | 4/2014 | Pan ............... H04W 76/023 370/329 |
| 2014/0307603 | A1* | 10/2014 | Barany ............ H04W 52/02 370/311 |
| 2014/0335882 | A1* | 11/2014 | Lee .............. H04W 76/025 455/452.2 |
| 2015/0098379 | A1* | 4/2015 | Lunden ........... H04W 52/0209 370/311 |
| 2015/0098452 | A1 | 4/2015 | Dalsgaard et al. |
| 2015/0215912 | A1* | 7/2015 | Jha ............... H04W 76/048 370/311 |
| 2015/0365894 | A1* | 12/2015 | Bai ............... H04L 1/1854 370/311 |
| 2016/0174155 | A1 | 6/2016 | Nagata et al. |

OTHER PUBLICATIONS

"Discussions on some issues of dual connectivity", 3GPP TSG RAN WG2 Meeting #81, R2-130055, Jan. 28-Feb. 1, 2013, 4 pages, CMCC, (Author unknown).

"Discussion on small cell enhancement and dual connectivity", 3GPP TSG-RAN WG2 Meeting #81, R2-130100, Jan. 28-Feb. 1, 2013, 2 pages, Samsung, (Author unknown).

"Design of DRX for dual connectivity", 3GPP TSG-RAN WG2 Meeting #83, R2-132464, Aug. 19-23, 2013, 2 pages, Broadcom Corporation, (Author unknown).

"DRX impact by dual connectivity", 3GPP TSG-RAN WG2 Meeting #83, R2-132554, Aug. 19-23, 2013, 2 pages, LG Electronics Inc., (Author unknown).

"3rd Generation Partnership Project;Technical Specification Group Radio Access Network; Study on Small Cell enhancements for E-UTRA and E-UTRAN; Higher layer aspects (Release 12)", 3GPP TR 36.842 V12.0.0 (Dec. 2013), pp. 1-36, Author unknown).

"3rd Generation Partnership Project;Technical Specification Group Radio Access Network; Study on Small Cell enhancements for E-UTRA and E-UTRAN; Higher layer aspects (Release 12)", 3GPP TR 36.842 V12.0.0 (Dec. 2013), pp. 37-71, Author unknown).

"3rd Generation Partnership Project; Technical Specification Group Radio Access Network; Scenarios and requirements for small cell enhancements for E-UTRA and E-UTRAN (Release 12)", 3GPP TR 36.932 V12.1.0 (Mar. 2013), 14 pages, (Author unknown).

"LTE; Evolved Universal Terrestrial Radio Access (E-UTRA); Requirements for support of radio resource management (3GPP TS 36.133 version 12.5.0 Release 12)", Section 6.2.2, 45 pages, (Nov. 2014), (Author unknown).

"LTE; Evolved Universal Terrestrial Radio Access (E-UTRA); Requirements for support of radio resource management (3GPP TS 36.133 version 12.5.0 Release 12)", Section 6.3.2, pp. 1-23, (Nov. 2014), (Author unknown).

"LTE; Evolved Universal Terrestrial Radio Access (E-UTRA); Requirements for support of radio resource management (3GPP TS 36.133 version 12.5.0 Release 12)", Section 6.3.2, pp. 24-45, (Nov. 2014), (Author unknown).

"LTE; Evolved Universal Terrestrial Radio Access (E-UTRA); Requirements for support of radio resource management (3GPP TS 36.133, Version 12.5.0, Release 12)" Sections 7 & 8, pp. 1-22, (Nov. 2014), (Author unknown).

"LTE; Evolved Universal Terrestrial Radio Access (E-UTRA); Requirements for support of radio resource management (3GPP TS 36.133, Version 12.5.0, Release 12)" Sections 7 & 8, pp. 23-44, (Nov. 2014), (Author unknown).

"LTE; Evolved Universal Terrestrial Radio Access (E-UTRA); Requirements for support of radio resource management (3GPP TS 36.133, Version 12.5.0, Release 12)" Sections 7 & 8, pp. 45-67, (Nov. 2014), (Author unknown).

"LTE; Evolved Universal Terrestrial Radio Access (E-UTRA); Requirements for support of radio resource management (3GPP TS 36.133, Version 12.5.0, Release 12)" Sections 7 & 8, pp. 68-86, (Nov. 2014), (Author unknown).

Catt, Further consideration on DRX [online], 3GPP TSG-RAN WG2#84, R2-134059, Nov. 15, 2013, URL: www.3gpp.org/ftp/tsg_ranN1/G2_RL2fTSGR2_84/Docs/R2-1340592ip, 2 pages.

Supplementary European Search Report received for European Patent Application No. 15733313.9, dated Nov. 29, 2017, 14 pages.

Broadcom Corporation "Coordinated DRX for Dual Connectivity" 3GPP Draft; R2-133998_COORDINATED_DRX_FOR_DUAL_CONNECTIVITY_V6, 3rd Generation Partnership Project (3GPP), vol. Ran WG2, No. San Francisco, USA: 20111111-20111115, Nov. 13, 2013, XP050736806, retrieved from ittp://www.3gpp.org/ftp/meetings_3gpp_sync/ran/ran2/docs.

Office Action received for U.S. Appl. No. 15/396,477, dated Mar. 22, 2018, 16 pages.

Panasonic,DRX procedure for dual connectivity[online],3GPP TSG-RAN W G2#83bis 109,R2-133313,2013 年10月10日, URL:http://www.3gpp.org/ft p/tsg_ran/WG2_RL2/TSGR2_83bis/Docs/R2-133313.zip.

Nokia Corporation, NSN,DRX for dual connectivity[online],3GPP TSG-RA N WG2#84 R2-133871,2013年 11月15日, URL:http://www.3gpp.org/ft p/tsg_ran/WG2_RL2/TSGR2_84/Docs/R2-133871.zip.

* cited by examiner

FIG. 6A

_Storage Medium 600_

*Computer Executable Instructions for 300*

FIG. 6B

_Storage Medium 650_

*Computer Executable Instructions for 400*

*Computer Executable Instructions for 500*

Broadband Wireless Access System
800

US 10,075,988 B2

DISCONTINUOUS RECEPTION (DRX) ALIGNMENT TECHNIQUES FOR DUAL-CONNECTIVITY ARCHITECTURES

RELATED CASE

This application claims priority to U.S. Provisional Patent Application No. 61/924,194, filed Jan. 6, 2014, the entirety of which is hereby incorporated by reference.

TECHNICAL FIELD

Embodiments herein generally relate to communications between devices in broadband wireless communications networks.

BACKGROUND

In an evolved universal mobile telecommunications system (UMTS) terrestrial radio access network (E-UTRAN), a user equipment (UE) that has established data connectivity with an evolved node B (eNB) may operate in a discontinuous reception (DRX) mode. While operating in the DRX mode, the UE may disable its receiver and enter a low power state during some time periods, in order to conserve power. The frequencies and durations of the periods during which the UE enters the low power state may be specified by DRX settings that the UE receives from the eNB.

In a E-UTRAN that supports dual-connectivity, a UE may be able to establish concurrent data connectivity with a master evolved node B (MeNB) of a master cell group (MCG) and a secondary evolved node B (SeNB) of a secondary cell group (SCG). In such a scenario, the UE may be configured with the capability of recognizing and observing distinct DRX states and sets of DRX parameters with respect to monitoring a macro cell control channel of the MeNB and a small cell control channel of the SeNB. At any given point in time, if the UE is in a DRX sleep state with respect to one cell but is in a DRX active state with respect to the other, the UE may not be able to enter the low power state. As such, it may be desirable to align the macro cell and small cell DRX parameters in order to achieve a greater degree of overlap between the UE's macro cell and small cell DRX sleep states that may exist in the absence of such alignment.

BRIEF DESCRIPTION OF THE DRAWINGS

FIG. 6A illustrates an embodiment of a first storage medium.
FIG. 6B illustrates an embodiment of a second storage medium.

DETAILED DESCRIPTION

Figure 1:
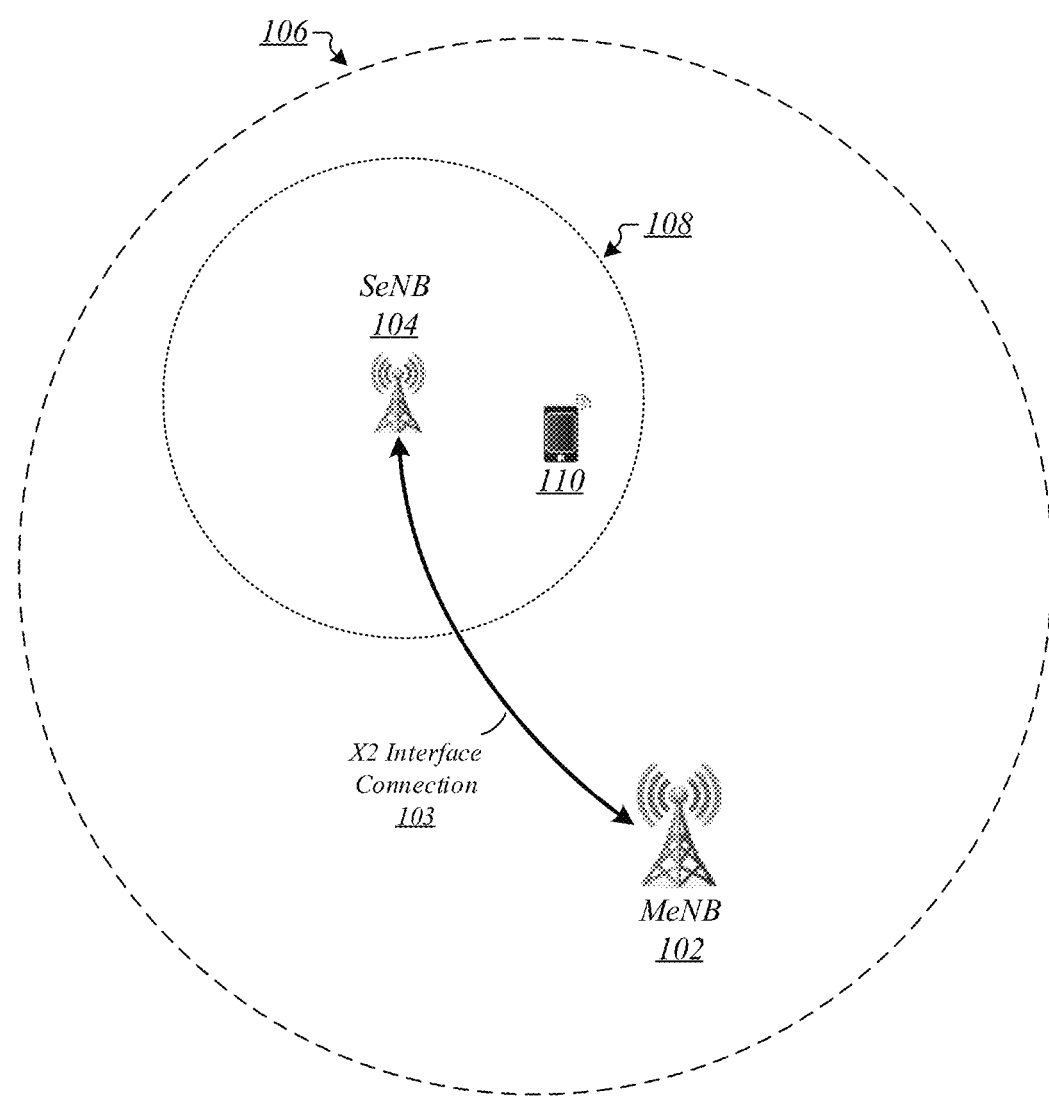
FIG. 1 illustrates an embodiment of a first operating environment.

Various embodiments may be generally directed to discontinuous reception (DRX) alignment techniques for dual-connectivity architectures. In one embodiment, for example, user equipment (UE) may comprise one or more radio frequency (RF) transceivers, one or more RF antennas, and logic, at least a portion of which is in hardware, the logic to receive a radio resource control (RRC) configuration information message containing a small cell RRC configuration information element (IE), the small cell RRC configuration IE to contain a small cell discontinuous reception (DRX) configuration IE comprising one or more inter-cell-coordinated small cell DRX parameters, the logic to determine a start time for a small cell DRX cycle based on at least one of the one or more inter-cell-coordinated small cell DRX parameters and initiate the small cell DRX cycle at the determined start time. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their predecessors, revisions, progeny, and/or variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Some embodiments may additionally or alternatively involve wireless communications according to other wireless communications technologies and/or standards.

Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards, and/or near-field communication (NFC) standards such as standards developed by the NFC Forum, including any predecessors, revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of an operating environment 100 such as may be representative of various embodiments. In the example operating environment 100 of FIG. 1, an MeNB 102 communicates with an SeNB 104 via an X2 interface connection 103. In various embodiments, X2 interface connection 103 may be implemented via a backhaul between MeNB 102 and SeNB 104. In some embodiments, the backhaul may comprise a backhaul that is categorized as being non-ideal according to 3GPP TR 36.932 ver. 12.1.0 (released March 2013), and/or according to any predecessors, revisions, progeny, and/or variants thereof. SeNB 104 may generally provide wireless service within a small cell 108, and MeNB 102 may generally provide wireless service within an overlaid macro cell 106. In example operating environment 100, a UE 110 resides at a position located within small cell 108, and that position is also located within the overlaid macro cell 106.

In various embodiments, UE 110 may wirelessly communicate with MeNB 102 and/or SeNB 104 according to a set of wireless communications specifications, such as 3GPP Release 12 (Rel-12). In some embodiments, based on the set of wireless communications specifications, UE 110 may be configured with the capability of entering into a dual-connectivity mode of operation, according to which the UE 110 is provided with concurrent data connectivity to both MeNB 102 and SeNB 104. During dual-connectivity operation in various embodiments, UE 110 may be provided with data connectivity to MeNB 102 via a first data connection that utilizes a first wireless communication frequency, and may concurrently be provided with data connectivity to SeNB 104 via a second data connection that utilizes a second wireless communication frequency.

In some embodiments, the set of wireless communications specifications may stipulate that UE 110 is to possess a single radio resource control (RRC) state that applies to both MeNB 102 and SeNB 104. In various embodiments, for example, UE 110 may be permitted either to be in an RRC_Connected state with respect to both MeNB 102 and SeNB 104 or to be in an RRC_Idle state with respect to both MeNB 102 and SeNB 104, but not permitted to be in an RRC_Connected state with respect to one while being in an RRC_Idle state with respect to the other. In some embodiments, according to the set of wireless communication specifications, MeNB 102 may be responsible for transmitting RRC messages to UE 110 in conjunction with management of the RRC state of UE 110. In various embodiments, the set of wireless communications specifications may not support transmission of RRC messages on the part of SeNB 104.

In various embodiments, according to the set of wireless communication specifications, UE 110 may be configured with the capability of recognizing and observing distinct respective DRX states and different respective sets of DRX parameters in conjunction with monitoring a control channel of macro cell 106 and a control channel of small cell 108. In order to maximize the DRX-associated power savings at UE 110, it may be desirable to align the macro cell DRX parameters for UE 110 with the small cell DRX parameters for UE 110. More particularly, it may be desirable to align these parameters in order to achieve a greater degree of overlap between periods during which UE 110 is in a DRX sleep state with respect to macro cell 106 and the periods during which UE 110 is in a DRX sleep state with respect to small cell 108.

One challenge associated with aligning these DRX parameters may be that the system timings for MeNB 102 and SeNB 104 may not necessarily be synchronized, and thus their System Frame Numbers (SFNs) may not match. The timings according to which UE 110 applies the macro cell DRX parameters and the small cell DRX parameters may depend on the respective macro cell and small cell SFNs. As such, even if the macro cell DRX parameters and small cell DRX parameters are identical, the macro cell and small cell DRX states of UE 110 may be poorly aligned due to timing differences. Another challenge associated with aligning macro cell and small cell DRX parameters may be a lack of information exchange mechanisms via which MeNB 102 and SeNB 104 may exchange information regarding the DRX parameters for UE 110. For example, in conventional systems, MeNB 102 and SeNB 104 may have no way of exchanging information regarding the small cell DRX parameters for UE 110.

Disclosed herein are DRX alignment techniques for dual-connectivity architectures. According to some such techniques, MeNB 102 and SeNB 104 may communicate over X2 interface connection 103 to exchange information regarding DRX parameters for UE 110. In various embodiments, a small cell RRC information element (IE) may be defined to carry information describing the small cell RRC configuration of UE 110. In some embodiments, a small cell RRC X2 message may be defined to enable the small cell RRC IE to be exchanged between MeNB 102 and SeNB 104. In various embodiments, the small cell RRC IE may comprise a newly defined small cell DRX configuration IE that contains information describing the small cell DRX configuration for UE 110. In some embodiments, the small cell DRX configuration IE may comprise a small cell DRX offset value. In various embodiments, the small cell DRX offset value may be selected to compensate for a difference between the macro cell timing and the small cell timing. In some embodiments, a new X2 message may be defined to enable MeNB 102 to transfer a DRX command MAC CE to SeNB 104 in order to inform SeNB 104 that UE 110 will enter the DRX mode in the MCG. The embodiments are not limited in this context.

Figure 2:
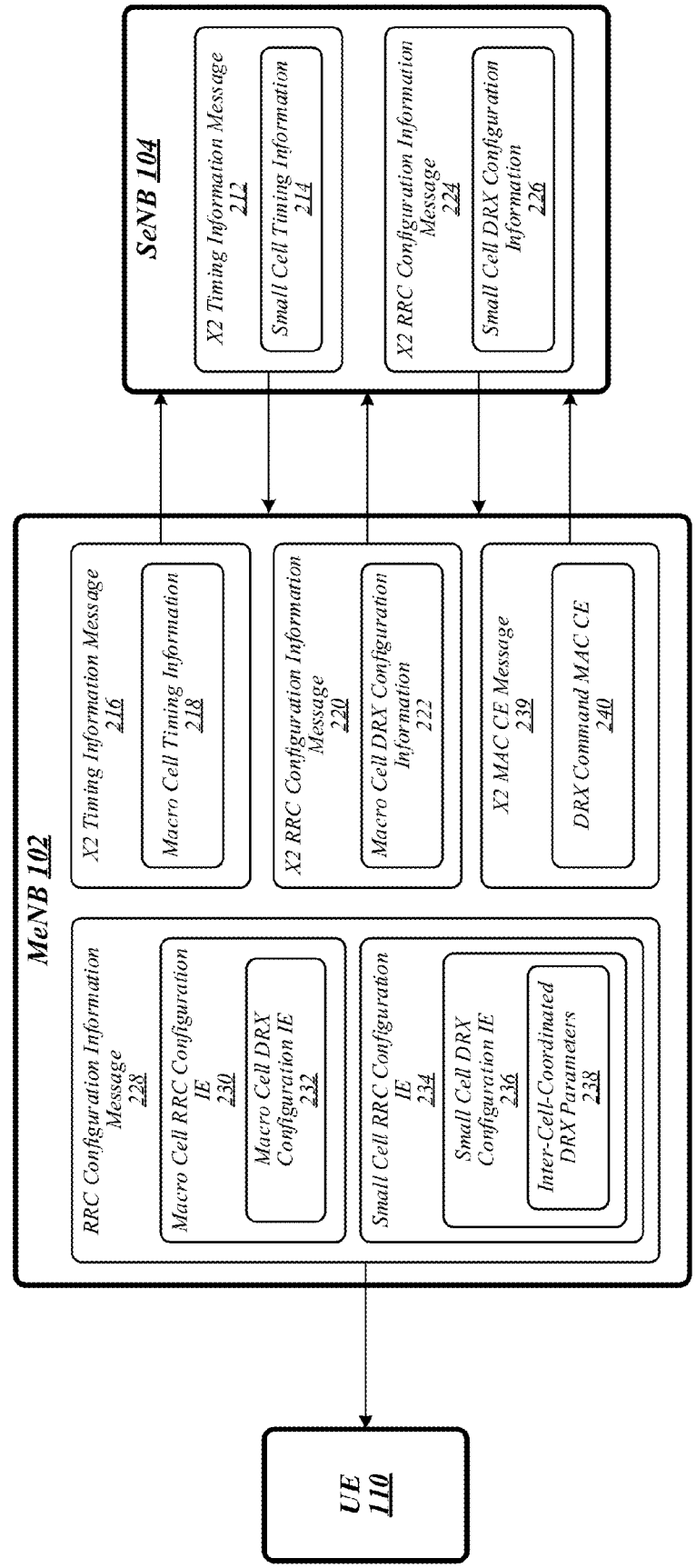
FIG. 2 illustrates an embodiment a second operating environment.

FIG. 2 illustrates an example of an operating environment 200 in which DRX alignment techniques for dual-connectivity architectures may be implemented in various embodiments. Depicted in FIG. 2 are various messages that may be exchanged in some embodiments in conjunction with the application of such techniques. It is to be appreciated that any particular message depicted in FIG. 2 may not necessarily be utilized in all embodiments, and that in various embodiments, the implementation of the disclosed DRX alignment techniques may involve the exchange of one or more messages not depicted in FIG. 2. It is further to be appreciated that although all of the messages depicted in FIG. 2 are exchanged among MeNB 102, SeNB 104, and UE 110, in some embodiments, one or more other devices may participate in communications supporting DRX alignment. The embodiments are not limited in this context.

In operating environment 200, MeNB 102 and SeNB 104 may exchange one or more messages over an X2 interface connection, such as X2 interface connection 103 of FIG. 1, in order to align macro cell DRX parameters for UE 110 with small cell DRX parameters for UE 110. In various embodiments, MeNB 102 and SeNB 104 may coordinate with each other in order to fully align the macro cell and small cell DRX parameters for UE 110. In some such embodiments, MeNB 102 and SeNB 104 may coordinate with each other to determine a timing offset between the macro cell and the small cell and report the timing offset to UE 110. UE 110 may then apply a same set of DRX configuration parameters to both the macro cell and the small cell, and may compensate for the timing offset in conjunction with its respective applications of the DRX configuration parameters to its monitoring of the macro cell and small cell control channels. In various other embodiments, MeNB 102 and SeNB 104 may coordinate with each other in order to partially align the macro cell and small cell DRX parameters for UE 110. For example, in some embodiments, MeNB 102 and SeNB 104 may coordinate in order to align the long DRX cycles and ON durations of the macro cell and the small cell. In various such embodiments, MeNB 102 and SeNB 104 may coordinate with each other to determine a timing offset between the macro cell and the small cell, and then may take this offset into account while selecting separate respective sets of DRX parameters. The embodiments are not limited in this context.

In some embodiments, SeNB 104 may send an X2 timing information message 212 to MeNB 102. In various embodiments, X2 timing information message 212 may comprise a message of a type defined for use to convey timing information regarding any given cell from a serving eNB of that cell to a serving eNB of another cell, via an X2 interface connection. In some embodiments, X2 timing information message 212 may comprise small cell timing information 214. Small cell timing information 214 may generally comprise information describing the timing of the small cell served by SeNB 104. In some embodiments, small cell timing information 214 may identify a system frame number (SFN) for the small cell and a time value indicating an absolute time at which the small cell SFN was determined. In some embodiments, small cell timing information 214 may also identify a subframe number, and the time value may more particularly indicate the absolute time at which the small cell SFN and subframe number were determined. In various other embodiments, SeNB 104 may be configured to determine the time value as the absolute time at which the small cell SFN began, and no subframe number may be included. The embodiments are not limited in this context.

In some embodiments, MeNB 102 may send an X2 timing information message 216 to SeNB 104. In various embodiments, X2 timing information message 216 may comprise a message of a same type as X2 timing information message 212, and may comprise macro cell timing information 218. Macro cell timing information 218 may generally comprise information describing the timing of the macro cell served by MeNB 102. In some embodiments, macro cell timing information 218 may comprise an SFN for the macro cell and an absolute time corresponding to that SFN. In various embodiments, macro cell timing information 218 may also identify a subframe number, and the time value may more particularly indicate the absolute time at which the macro cell SFN and subframe number were determined. In some other embodiments, MeNB 104 may be configured to determine the time value as the absolute time at which the macro cell SFN began, and no subframe number may be included. The embodiments are not limited in this context.

In various embodiments, SeNB 104 may be operative to determine an inter-cell timing offset based on macro cell timing information 218. In some embodiments, the inter-cell timing offset may generally indicate a timing difference between the timing in the macro cell served by MeNB 102 and the timing in the small cell served by SeNB 104. In various embodiments, the inter-cell timing offset may comprise a number of frames by which the respective timings are offset from one another. In some embodiments, SeNB 104 may be operative to determine the inter-cell timing offset at a subframe level of granularity, such that it indicates a number of frames and subframes by which the respective timings are offset. In various embodiments, SeNB 104 may be operative to determine the inter-cell timing offset at a smaller level of granularity, such as a granularity of one or more OFDM symbols. The embodiments are not limited in this context.

In some embodiments, MeNB 102 may send an X2 RRC configuration information message 220 to SeNB 104. In various embodiments, X2 RRC configuration information message 220 may comprise a message of a type defined for use to convey RRC configuration information for one serving cell of a dually-connected UE from an eNB of that cell to an eNB of another serving cell of the dually-connected UE, via an X2 interface connection. In some embodiments, MeNB 102 may use X2 RRC configuration information message 220 to send macro cell DRX configuration information 222 to SeNB 104. In various embodiments, macro cell DRX configuration information 222 may identify a set of macro cell DRX parameters that MeNB 102 has selected for UE 110. In some embodiments, X2 RRC configuration information message 220 may be an X2 message defined for sole the purpose of conveying DRX configuration information between eNBs. In various other embodiments, macro cell DRX configuration information 222 may be an X2 message defined for a more general purpose. For example, in some embodiments, in addition to macro cell DRX configuration information 222, X2 RRC configuration information message 220 may comprise non-DRX-related RRC configuration information for the macro cell. The embodiments are not limited in this context.

In various embodiments, SeNB 104 may be operative to select a set of small cell DRX parameters for UE 110. In some embodiments, SeNB 104 may be operative to select the small cell DRX parameters for UE 110 based on macro cell timing information 218 and macro cell DRX configuration information 222. In various embodiments, SeNB 104 may be operative to determine the inter-cell timing offset based on macro cell timing information 218, identify the set of macro cell DRX parameters for UE 110 based on macro cell DRX configuration information 222, and select the set of small cell DRX parameters for UE 110 based on the macro cell DRX parameters for UE 110 and the inter-cell timing offset. In some embodiments, based on the inter-cell timing offset, SeNB 104 may be operative to select, for one or more of the small cell DRX parameters, respective values that will align the long DRX cycle in the small cell with the long DRX cycle in the macro cell. In various embodiments, SeNB 104 may additionally or alternatively be operative to select, for one or more of the small cell DRX parameters, respective values that will align the DRX ON duration in the small cell with the DRX ON duration in the macro cell. The embodiments are not limited to these examples.

In some embodiments, MeNB 102 may be responsible for RRC configuration of UE 110, both with respect to the macro cell that it serves and with respect to the small cell that SeNB serves. In various embodiments, MeNB 102 may thus be responsible for configuring UE 110 with the set of small cell DRX parameters selected by SeNB 104. In some embodiments, SeNB 104 may therefore be operative to send an X2 RRC configuration information message 224 to notify MeNB 102 of the set of small cell DRX parameters that it has selected for UE 110. In various embodiments, SeNB 104 may use X2 RRC configuration information message 224 to send small cell DRX configuration information 226 to MeNB 102. In some embodiments, small cell DRX configuration information 226 may specify the set of small cell DRX parameters that SeNB 104 has selected for UE 110. In various embodiments, based on small cell DRX configuration information 226, MeNB 102 may be operative to identify the set of small cell DRX parameters for UE 110. In some embodiments, the type, format, syntax, usage conditions, and/or defined purpose of X2 RRC configuration information message 224 may be the same as—or similar to—those of X2 RRC configuration information message 220. However, it is to be understood that in various other embodiments, the two messages may differ in one or more such respects. The embodiments are not limited in this context.

In some embodiments, MeNB 102 may be operative to send an RRC configuration information message 228 to UE 110 in order to configure UE 110 with various RRC parameters. In various embodiments, MeNB 102 may use RRC configuration information message 228 to configure UE 110 with the set of macro cell DRX parameters that it has selected for UE 110 and the set of small cell DRX parameters that SeNB 104 has selected for UE 110. In some embodiments, RRC configuration information message 228 may comprise a macro cell RRC configuration IE 230. In various embodiments, macro cell RRC configuration IE 230 may comprise an IE designated for use to configure macro cell RRC parameters for a dually-connected UE. In some embodiments, macro cell RRC configuration IE 230 may comprise a RadioResourceConfigDedicated IE. In various embodiments, macro cell RRC configuration IE 230 may comprise a macro cell DRX configuration IE 232. In some embodiments, macro cell DRX configuration IE 232 may comprise an IE designated for use to configure one or more macro cell DRX parameters for a dually-connected UE. In various embodiments, macro cell DRX configuration IE 232 may comprise a DRX-Config IE. In some embodiments, macro cell DRX configuration IE 232 may comprise the set of macro cell DRX parameters that MeNB 102 has selected for UE 110.

In various embodiments, RRC configuration information message 228 may comprise a small cell RRC configuration IE 234. In some embodiments, small cell RRC configuration IE 234 may comprise an IE that is discrete from macro cell RRC configuration IE 230 and that is defined for use to configure one or more small cell RRC parameters for the dually-connected UE. In various embodiments, for example, small cell RRC configuration IE 234 may comprise a newly-defined RadioResourceConfigDedicatedSmallCell IE. In some embodiments, small cell RRC configuration IE 234 may comprise a small cell DRX configuration IE 236. In various embodiments, small cell DRX configuration IE 236 may comprise an IE that is defined for use to configure one or more small cell DRX parameters for the dually-connected UE. In some embodiments, small cell DRX configuration IE 236 may comprise a newly-defined DRX-Config-SmallCell IE. In various embodiments, small cell DRX configuration IE 236 may comprise the set of small cell DRX parameters that SeNB 104 has selected for UE 110. It is worthy of note that with respect to small cell RRC configuration IE 234 and small cell DRX configuration IE 236, the aforementioned names "RadioResourceConfigDedicatedSmallCell" and "DRX-Config-SmallCell" are merely examples, and the embodiments are not limited to these example names.

In some embodiments, small cell DRX configuration IE 236 may comprise one or more inter-cell-coordinated DRX parameters 238. With respect to DRX parameters, the term "inter-cell-coordinated" shall be used herein to denote DRX parameters selected based at least in part on an inter-cell timing offset determined via coordination between the respective serving eNBs of two serving cells of a dually-connected UE. For example, in embodiments in which SeNB 104 selects a set of small cell DRX parameters for UE 110 based on an inter-cell timing offset determined via coordination with MeNB 102, those selected small cell DRX parameters constitute inter-cell-coordinated DRX parameters 238. The embodiments are not limited to this example.

In various embodiments, UE 110 may be operative to receive RRC configuration information message 228 and determine a start time for a small cell DRX cycle based on one or more inter-cell-coordinated DRX parameters 238. In some embodiments, UE 110 may then be operative to initiate the small cell DRX cycle at the determined time. In various embodiments, as discussed above, the inter-cell-coordinated DRX parameters 238 may comprise a set of small cell DRX parameters for controlling small cell DRX operations of UE 110. In some embodiments, the set of small cell DRX parameters may comprise one or more parameters selected to align a long DRX cycle of the serving small cell of UE 110 with a long DRX cycle of the serving macro cell of UE 110. In various embodiments, the set of small cell DRX parameters may additionally or alternatively comprise one or more parameters selected to align a DRX ON duration of the serving small cell of UE 110 with a DRX ON duration of the serving macro cell of UE 110. The embodiments are not limited to these examples.

It is worthy of note that in some embodiments, MeNB 102 may be operative to select the set of macro cell DRX parameters for UE 110 based on small cell timing information 214 and small cell DRX configuration information 226. In various embodiments, SeNB 104 may be operative to select the set of small cell DRX parameters for UE 110 autonomously, and may communicate the selected small cell DRX parameters to MeNB 102 via small cell DRX configuration information 226 in X2 RRC configuration information message 224. In some embodiments, MeNB 102 may be operative to determine the inter-cell timing offset based on small cell timing information 214, identify the set of small cell DRX parameters for UE 110 based on small cell DRX configuration information 226, and select the set of macro cell DRX parameters for UE 110 based on the small cell DRX parameters for UE 110 and the inter-cell timing offset. In various embodiments, MeNB 102 may then be operative to use the macro cell DRX configuration IE 232 within RRC configuration information message 228 to configure UE 110 with the selected set of macro cell DRX parameters. In such embodiments, the selected set of macro cell DRX parameters in macro cell DRX configuration IE 232 constitutes a set of inter-cell-coordinated DRX parameters 238. The embodiments are not limited in this context.

In some embodiments, MeNB 102 may be operative to configure UE 110 with a set of DRX parameters that applies to both the macro cell and the small cell. In various embodiments, MeNB 102 may be operative to provide UE 110 with a small cell DRX offset value for use in compensating for the inter-cell timing offset between the macro cell and the small cell. In some embodiments, MeNB 102 may be operative to determine the small cell DRX offset value based on small cell timing information 214 received from SeNB 104. In various embodiments, MeNB 102 may send RRC configuration information message 228 to UE 110 to configure UE 110 with the set of DRX parameters. In some embodiments, MeNB 102 may include the small cell DRX offset value in RRC configuration information message 228. In various embodiments, RRC configuration information message 228 may comprise a newly defined field that contains the small cell DRX offset value. For example, in some embodiments, RRC configuration information message 228 may contain a newly-defined DRXOffsetForSmallCell field that contains the small cell DRX offset value. In various embodiments, the small cell DRX offset value may be comprised within a field in small cell DRX configuration IE 236. In some embodiments, the small cell DRX offset value may be the only parameter comprised within small cell DRX configuration IE 236. In various other embodiments, small cell DRX configuration IE 236 may comprise one or more other small cell DRX parameters. The embodiments are not limited in this context.

In some embodiments, MeNB 102 may be capable of instructing UE 110 to enter DRX mode by sending a DRX command media access control (MAC) control element (CE) to UE 110. In various embodiments, UE 110 may be configured to refer to the small cell DRX offset value in order to align the DRX ON duration after receiving a DRX command MAC CE from MeNB 102. In some embodiments, MeNB 102 may need to inform SeNB 104 that UE 110 will enter the DRX mode with respect to the macro cell. In various embodiments, MeNB 102 may be operative to send an X2 MAC CE message 239 in order to notify SeNB 104 that UE 110 will enter the DRX mode with respect to the macro cell. In some embodiments, X2 MAC CE message 239 may comprise a newly-defined X2 message for conveying a DRX command MAC CE from a macro cell eNB to a small cell eNB with which it has coordinated to align DRX parameters of a dually-connected UE, via an X2 interface connection. In various embodiments, MeNB 102 may be operative to send an X2 MAC CE message 239 to SeNB 104 that comprises the DRX command MAC CE 240 that was sent to UE 110. In some embodiments, by using X2 MAC CE message 239 to transfer DRX command MAC CE 240 to SeNB 104, MeNB 102 may notify SeNB 104 that UE 110 will enter the DRX mode with respect to the macro cell. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
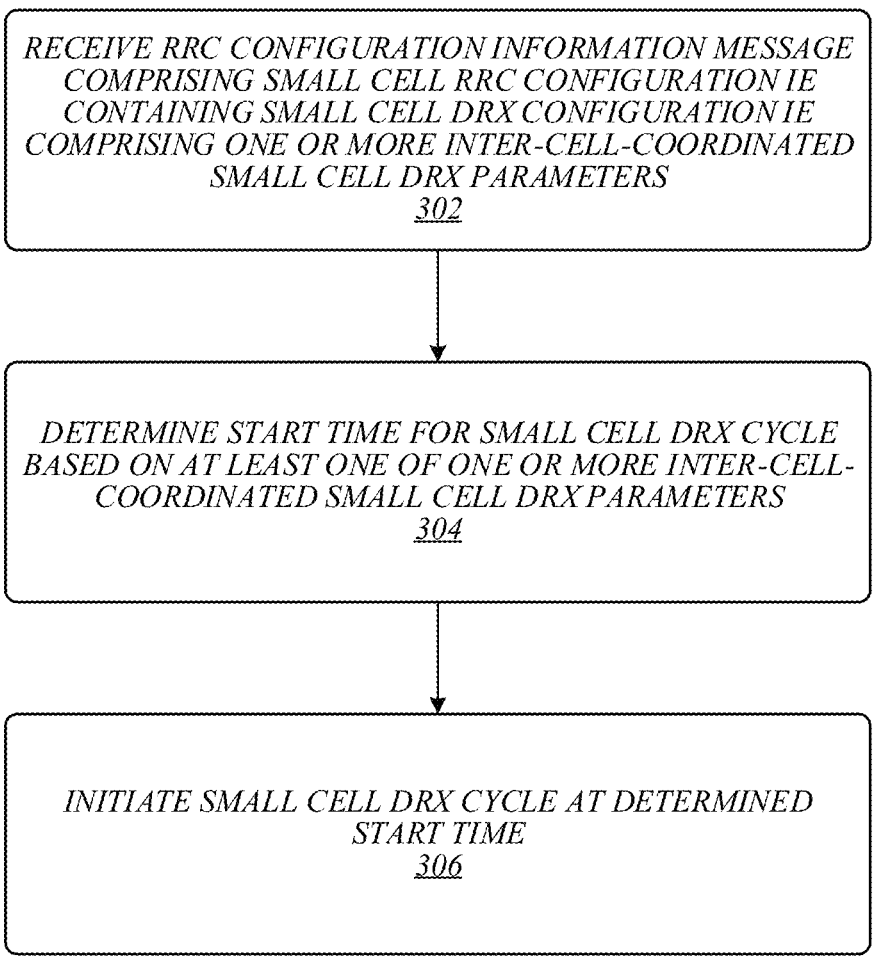
FIG. 3 illustrates an embodiment of a first logic flow.

FIG. 3 illustrates one embodiment of a logic flow 300, which may be representative of operations that may be performed in various embodiments by UE 110. As shown in logic flow 300, an RRC configuration information message may be received at 302 that comprises a small cell RRC configuration IE containing a small cell DRX configuration IE comprising one or more inter-cell-coordinated DRX parameters. For example, UE 110 may be operative to receive RRC configuration information message 228 from MeNB 102, and RRC configuration information message 228 may comprise a small cell RRC configuration IE 234 that contains a small cell DRX configuration IE 236 comprising one or more inter-cell-coordinated DRX parameters 238. At 304, a start time for a small cell DRX cycle may be determined based on at least one of the one or more inter-cell-coordinated DRX parameters. For example, UE 110 may be operative to determine a start time for a small cell DRX cycle based on at least one of one or more inter-cell-coordinated DRX parameters 238 comprised in RRC configuration information message 228. At 306, a small cell DRX cycle may be initiated at the determined start time. For example, UE 110 may be operative to initiate a small cell DRX cycle at a start time determined based on at least one of one or more inter-cell-coordinated DRX parameters 238 comprised in RRC configuration information message 228. The embodiments are not limited to these examples.

Figure 4:
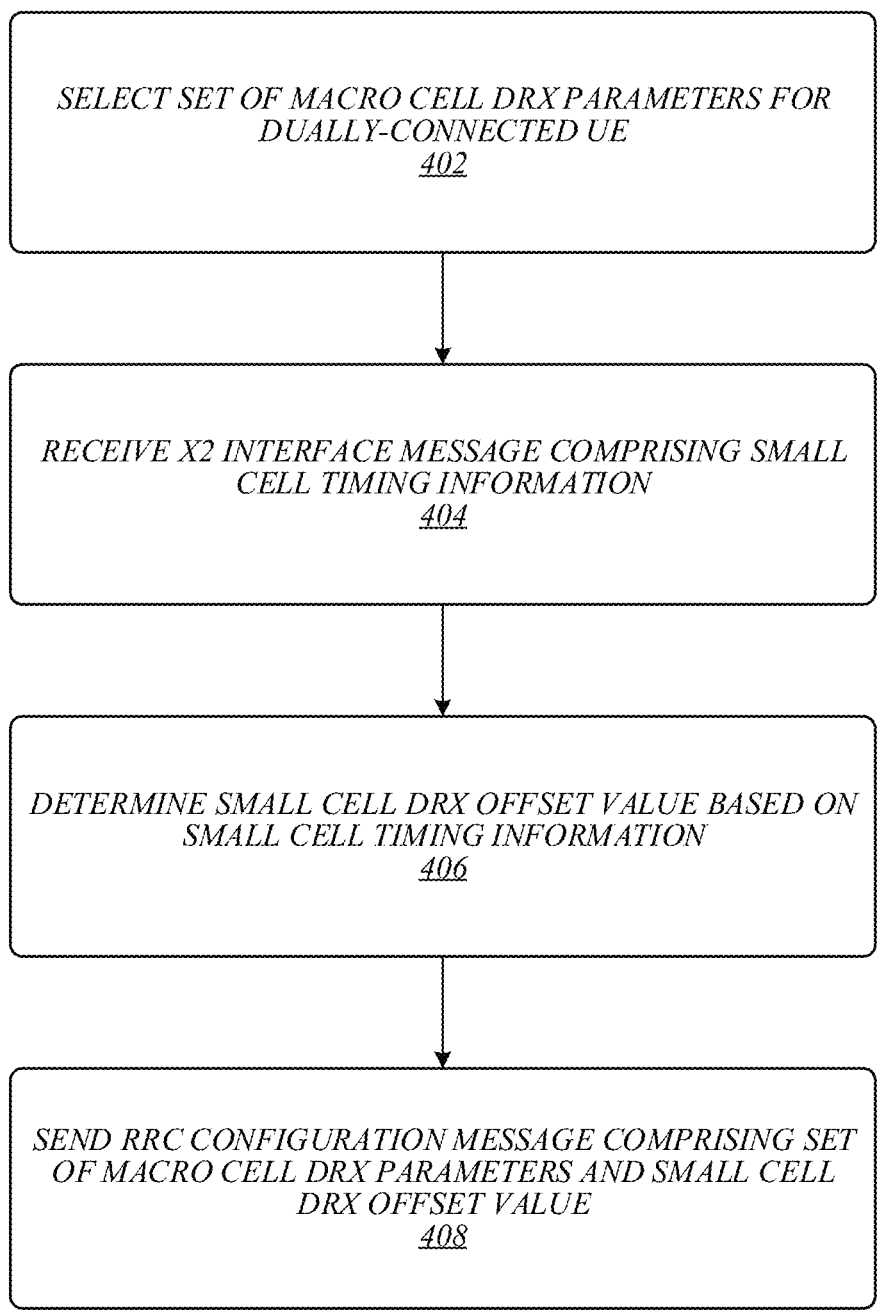
FIG. 4 illustrates an embodiment of a second logic flow.

FIG. 4 illustrates one embodiment of a logic flow 400, which may be representative of operations that may be performed in various embodiments by MeNB 102. As shown in FIG. 4, a set of macro cell DRX parameters may be selected for a dually-connected UE at 402. For example, MeNB 102 may be operative to select a set of macro cell DRX parameters for UE 110. At 404, an X2 interface message may be received that comprises small cell timing information. For example, MeNB 102 may be operative to an X2 timing information message 212 that comprises small cell timing information 214. At 406, a small cell DRX offset value may be determined based on the small cell timing information. For example, MeNB 102 may be operative to determine a small cell DRX offset value based on small cell timing information 214 received in X2 timing information message 212. At 408, an RRC configuration message may be sent that comprises the set of macro cell DRX parameters and the small cell DRX offset value. For example, MeNB 102 may be operative to send an RRC configuration information message 228 that comprises a macro cell DRX configuration IE 232 containing the selected macro cell DRX parameters and that comprises a small cell DRX configuration IE 236 containing the small cell DRX offset value. The embodiments are not limited to these examples.

Figure 5:
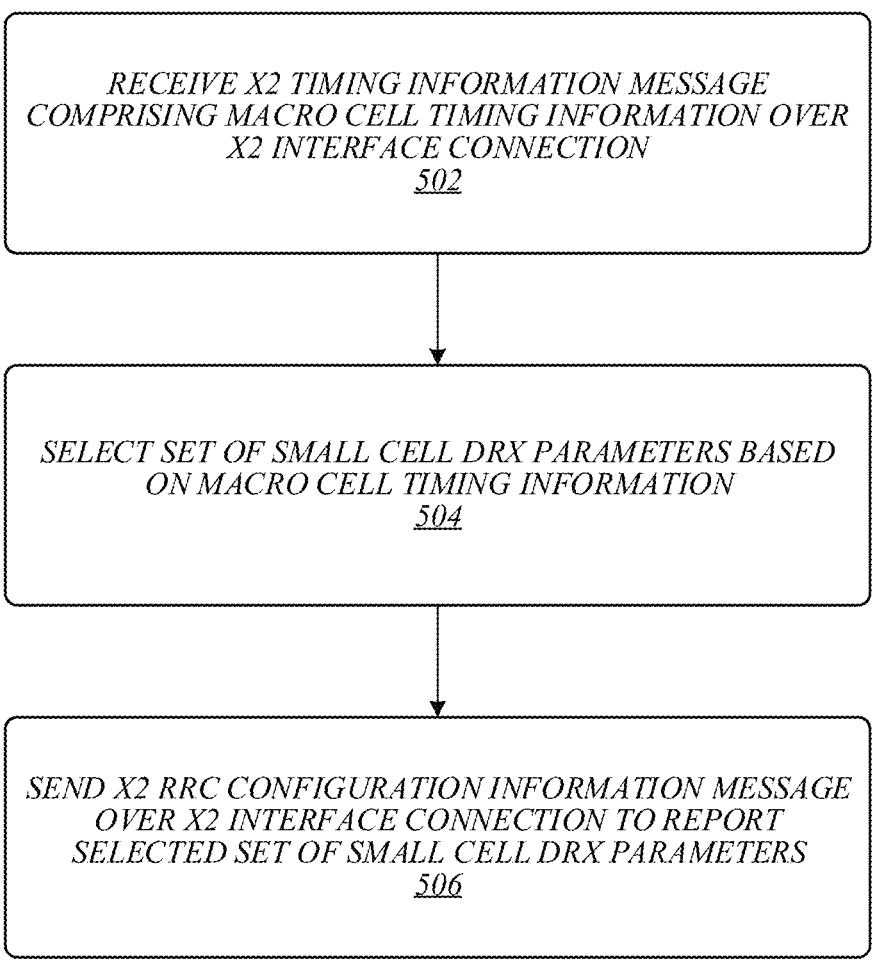
FIG. 5 illustrates an embodiment of a third logic flow.

FIG. 5 illustrates one embodiment of a logic flow 500, which may be representative of operations that may be performed in various embodiments by SeNB 104. As shown in FIG. 5, an X2 timing information message comprising macro cell timing information may be received over an X2 interface connection at 502. For example, SeNB 104 may be operative to an X2 timing information message 216 comprising macro cell timing information 218 over an X2 interface connection. At 504, a set of small cell DRX parameters may be selected based on the macro cell timing information. For example, SeNB 104 may be operative to select a set of small cell DRX parameters based on macro cell timing information 218 received in X2 timing information message 216. At 506, an X2 RRC configuration information message may be sent over the X2 interface connection to report the selected set of small cell DRX parameters. For example, SeNB 104 may be operative to send an X2 RRC configuration information message 224 over an X2 interface connection to report small cell DRX parameters that it has selected based on macro cell timing information 218 received in X2 timing information message 216. The embodiments are not limited to these examples.

FIG. 6A illustrates an embodiment of a storage medium 600. Storage medium 600 may comprise any non-transitory computer-readable storage medium or machine-readable storage medium, such as an optical, magnetic or semiconductor storage medium. In various embodiments, storage medium 600 may comprise an article of manufacture. In some embodiments, storage medium 600 may store computer-executable instructions, such as computer-executable instructions to implement logic flow 300 of FIG. 3. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

FIG. 6B illustrates an embodiment of a storage medium 650. Storage medium 650 may comprise any non-transitory computer-readable storage medium or machine-readable storage medium, such as an optical, magnetic or semiconductor storage medium. In various embodiments, storage medium 650 may comprise an article of manufacture. In some embodiments, storage medium 650 may store computer-executable instructions, such as computer-executable instructions to implement one or both of logic flow 400 of FIG. 4 and logic flow 500 of FIG. 5. Examples of a computer-readable/machine-readable storage medium and of computer-executable instructions may include—without limitation—any of the respective examples previously mentioned in reference to storage medium 600 of FIG. 6A. The embodiments are not limited in this context.

Figure 7:
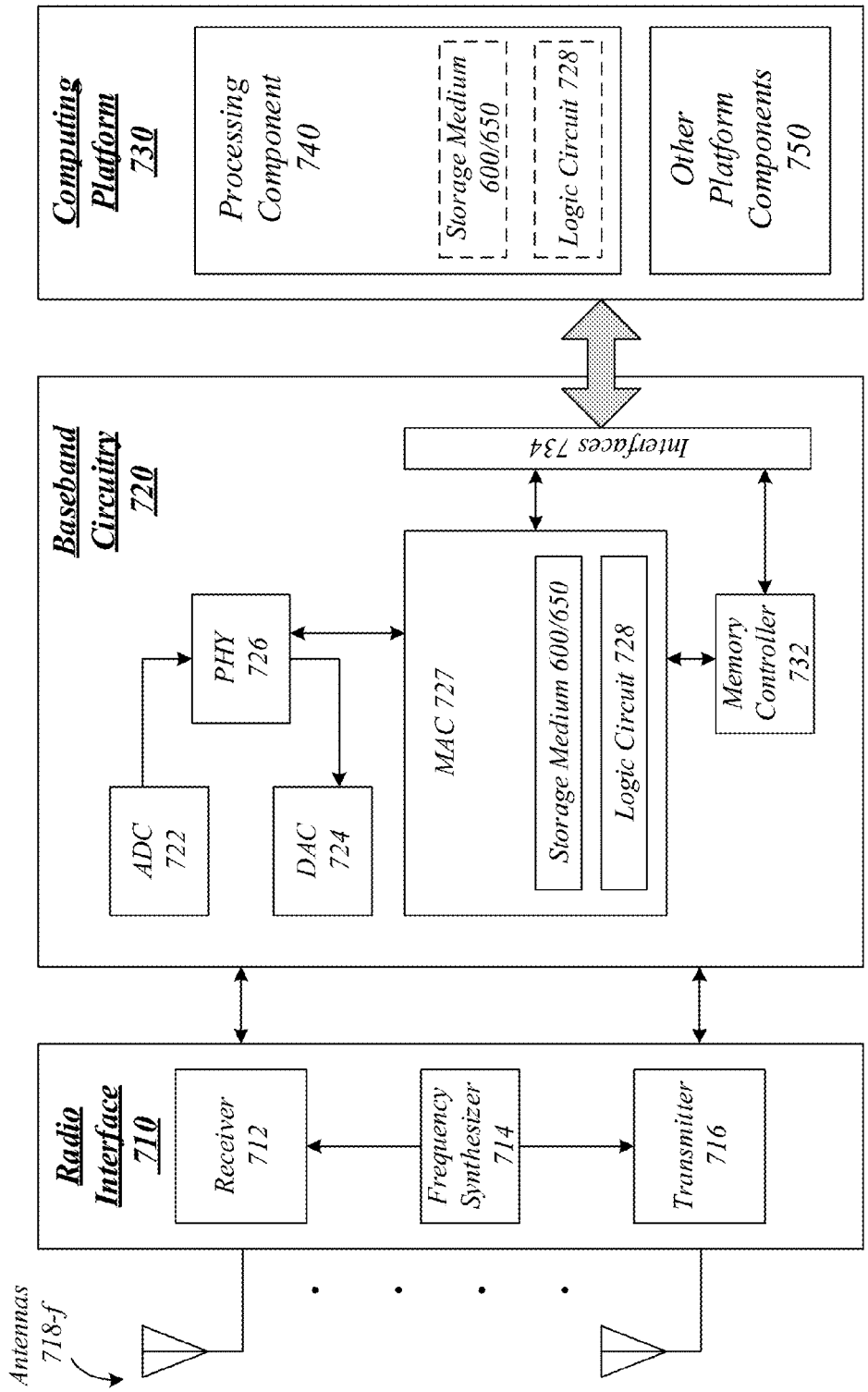
FIG. 7 illustrates an embodiment a device.

FIG. 7 illustrates an embodiment of a communications device 700 that may implement one or more of MeNB 102, SeNB 104, UE 110, logic flow 300, logic flow 400, logic flow 500, storage medium 600, and storage medium 650. In various embodiments, device 700 may comprise a logic circuit 728. The logic circuit 728 may include physical circuits to perform operations described for one or more of MeNB 102, SeNB 104, UE 110, logic flow 300, logic flow 400, and logic flow 500, for example. As shown in FIG. 7, device 700 may include a radio interface 710, baseband circuitry 720, and computing platform 730, although the embodiments are not limited to this configuration.

The device 700 may implement some or all of the structure and/or operations for one or more of MeNB 102, SeNB 104, UE 110, logic flow 300, logic flow 400, logic flow 500, storage medium 600, storage medium 650, and logic circuit 728 in a single computing entity, such as entirely within a single device. Alternatively, the device 700 may distribute portions of the structure and/or operations for one or more of MeNB 102, SeNB 104, UE 110, logic flow 300, logic flow 400, logic flow 500, storage medium 600, storage medium 650, and logic circuit 728 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 710 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 710 may include, for example, a receiver 712, a frequency synthesizer 714, and/or a transmitter 716. Radio interface 710 may include bias controls, a crystal oscillator and/or one or more antennas 718-*f*. In another embodiment, radio interface 710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 720 may communicate with radio interface 710 to process receive and/or transmit signals and may include, for example, an analog-to-digital converter 722 for down converting received signals, a digital-to-analog converter 724 for up converting signals for transmission. Further, baseband circuitry 720 may include a baseband or physical layer (PHY) processing circuit 726 for PHY link layer processing of respective receive/transmit signals. Baseband circuitry 720 may include, for example, a medium access control (MAC) processing circuit 727 for MAC/data link layer processing. Baseband circuitry 720 may include a memory controller 732 for communicating with MAC processing circuit 727 and/or a computing platform 730, for example, via one or more interfaces 734.

In some embodiments, PHY processing circuit 726 may include a frame construction and/or detection module, in combination with additional circuitry such as a buffer memory, to construct and/or deconstruct communication frames. Alternatively or in addition, MAC processing circuit 727 may share processing for certain of these functions or perform these processes independent of PHY processing circuit 726. In some embodiments, MAC and PHY processing may be integrated into a single circuit.

The computing platform 730 may provide computing functionality for the device 700. As shown, the computing platform 730 may include a processing component 740. In addition to, or alternatively of, the baseband circuitry 720, the device 700 may execute processing operations or logic for one or more of MeNB 102, SeNB 104, UE 110, logic flow 300, logic flow 400, logic flow 500, storage medium 600, storage medium 650, and logic circuit 728 using the processing component 740. The processing component 740 (and/or PHY 726 and/or MAC 727) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 730 may further include other platform components 750. Other platform components 750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 700 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 700 described herein, may be included or omitted in various embodiments of device 700, as suitably desired.

Embodiments of device 700 may be implemented using single input single output (SISO) architectures. However, certain implementations may include multiple antennas (e.g., antennas 718-f) for transmission and/or reception using adaptive antenna techniques for beamforming or spatial division multiple access (SDMA) and/or using MIMO communication techniques.

The components and features of device 700 may be implemented using any combination of discrete circuitry, application specific integrated circuits (ASICs), logic gates and/or single chip architectures. Further, the features of device 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 8:
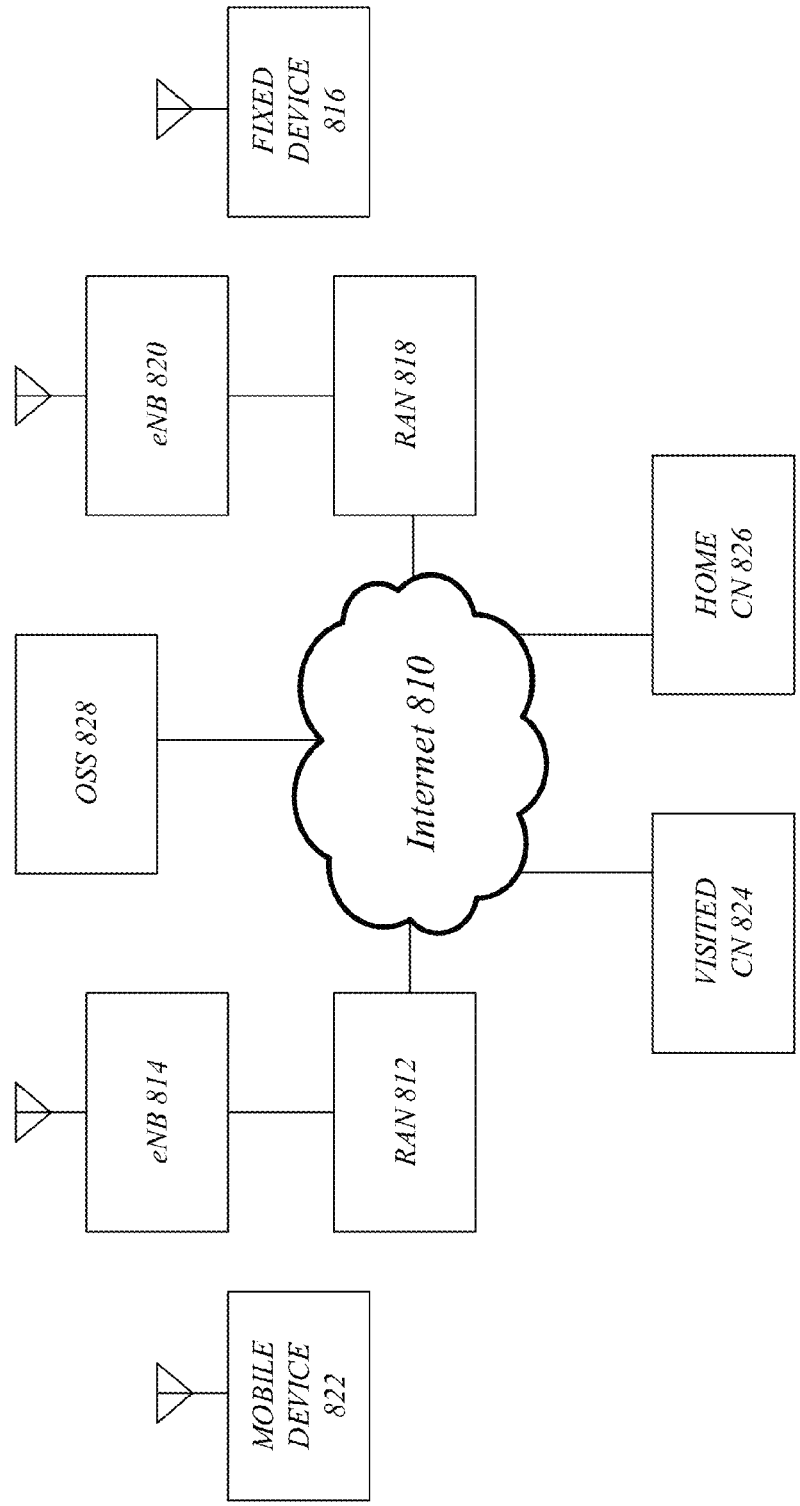
FIG. 8 illustrates an embodiment of a wireless network.

FIG. 8 illustrates an embodiment of a broadband wireless access system 800. As shown in FIG. 8, broadband wireless access system 800 may be an internet protocol (IP) type network comprising an internet 810 type network or the like that is capable of supporting mobile wireless access and/or fixed wireless access to internet 810. In one or more embodiments, broadband wireless access system 800 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 800, radio access networks (RANs) 812 and 818 are capable of coupling with evolved node Bs (eNBs) 814 and 820, respectively, to provide wireless communication between one or more fixed devices 816 and internet 810 and/or between or one or more mobile devices 822 and Internet 810. One example of a fixed device 816 and a mobile device 822 is device 700 of FIG. 7, with the fixed device 816 comprising a stationary version of device 700 and the mobile device 822 comprising a mobile version of device 700. RANs 812 and 818 may implement profiles that are capable of defining the mapping of network functions to one or more physical entities on broadband wireless access system 800. eNBs 814 and 820 may comprise radio equipment to provide RF communication with fixed device 816 and/or mobile device 822, such as described with reference to device 700, and may comprise, for example, the PHY and MAC layer equipment in compliance with a 3GPP LTE Specification or an IEEE 802.16 Standard. eNBs 814 and 820 may further comprise an IP backplane to couple to Internet 810 via RANs 812 and 818, respectively, although the scope of the claimed subject matter is not limited in these respects.

Broadband wireless access system 800 may further comprise a visited core network (CN) 824 and/or a home CN 826, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 824 and/or home CN 826, and the scope of the claimed subject matter is not limited in these respects. Visited CN 824 may be referred to as a visited CN in the case where visited CN 824 is not part of the regular service provider of fixed device 816 or mobile device 822, for example where fixed device 816 or mobile device 822 is roaming away from its respective home CN 826, or where broadband wireless access system 800 is part of the regular service provider of fixed device 816 or mobile device 822 but where broadband wireless access system 800 may be in another location or state that is not the main or home location of fixed device 816 or mobile device 822. The embodiments are not limited in this context.

Fixed device 816 may be located anywhere within range of one or both of eNBs 814 and 820, such as in or near a home or business to provide home or business customer broadband access to Internet 810 via eNBs 814 and 820 and RANs 812 and 818, respectively, and home CN 826. It is worthy of note that although fixed device 816 is generally disposed in a stationary location, it may be moved to different locations as needed. Mobile device 822 may be utilized at one or more locations if mobile device 822 is within range of one or both of eNBs 814 and 820, for example. In accordance with one or more embodiments, operation support system (OSS) 828 may be part of broadband wireless access system 800 to provide management functions for broadband wireless access system 800 and to provide interfaces between functional entities of broadband wireless access system 800. Broadband wireless access system 800 of FIG. 8 is merely one type of wireless network showing a certain number of the components of broadband wireless access system 800, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is user equipment (UE), comprising: logic, at least a portion of which is in hardware, the logic to receive a radio resource control (RRC) configuration information message comprising a small cell RRC configuration information element (IE), the small cell RRC configuration IE to contain a small cell discontinuous reception (DRX) configuration IE comprising one or more inter-cell-coordinated small cell DRX parameters, the logic to determine a start time for a small cell DRX cycle based on at least one of the one or more inter-cell-coordinated small cell DRX parameters and initiate the small cell DRX cycle at the determined start time.

Example 2 is the UE of Example 1, the one or more intercell-coordinated small cell DRX parameters to comprise a small cell DRX offset value.

Example 3 is the UE of Example 2, the small cell DRX offset value to indicate a timing offset between a master cell group (MCG) for the UE and a secondary cell group (SCG) for the UE.

Example 4 is the UE of Example 3, the small cell DRX offset value to indicate the timing offset at a level of granularity no larger than one subframe.

Example 5 is the UE of Example 2, the logic to determine the start time for the small cell DRX cycle based on the small cell DRX offset value.

Example 6 is the UE of Example 1, the small cell DRX configuration IE to comprise a set of small cell DRX parameters for controlling small cell DRX operations of the UE.

Example 7 is the UE of Example 6, the set of small cell DRX parameters to comprise one or more parameters selected to align a long DRX cycle of a serving small cell of the UE with a long DRX cycle of a serving macro cell of the UE.

Example 8 is the UE of Example 6, the set of small cell DRX parameters to comprise one or more parameters selected to align a DRX ON duration of a serving small cell of the UE with a DRX ON duration of a serving macro cell of the UE.

Example 9 is the UE of any of Examples 1 to 8, comprising: one or more radio frequency (RF) transceivers; and one or more RF antennas.

Example 10 is the UE of Example 9, comprising a touchscreen display.

Example 11 is an evolved node B (eNB), comprising: logic, at least a portion of which is in hardware, the logic to select a set of macro cell discontinuous reception (DRX) parameters for dually-connected user equipment (UE), receive an X2 interface message comprising small cell timing information, determine a small cell DRX offset value based on the small cell timing information, and send a radio resource control (RRC) configuration message comprising the set of macro cell DRX parameters and the small cell DRX offset value.

Example 12 is the eNB of Example 11, the small cell timing information to comprise a small cell system frame number (SFN) and an absolute time comprising a start time of a small cell frame corresponding to the small cell SFN.

Example 13 is the eNB of Example 11, the small cell timing information to comprise a small cell system frame number (SFN), a small cell subframe number, and an absolute time comprising a start time of a small cell subframe within a small cell frame corresponding to the small cell SFN, the small cell subframe corresponding to the small cell subframe number.

Example 14 is the eNB of Example 11, the small cell DRX offset value to indicate an offset between a system timing of a small cell and a system timing of a macro cell served by the eNB.

Example 15 is the eNB of Example 11, the logic to determine the small cell DRX offset value at a level of granularity of less than one subframe.

Example 16 is the eNB of Example 11, the RRC configuration message to contain a RadioResourceConfigDedicated IE comprising the set of macro cell DRX parameters and to contain a small cell RRC configuration IE comprising the small cell DRX offset value.

Example 17 is the eNB of Example 16, the small cell RRC configuration IE to comprise a small cell DRX configuration IE that contains the small cell DRX offset value.

Example 18 is the eNB of Example 11, the logic to send a DRX command media access control (MAC) control element (CE) to instruct the dually-connected UE to enter a DRX mode with respect a macro cell served by the eNB and send an X2 MAC CE message to transfer the DRX command MAC CE over an X2 interface connection.

Example 19 is the eNB of any of Examples 11 to 18, comprising: at least one radio frequency (RF) transceiver; and at least one RF antenna.

Example 20 is an evolved node B (eNB), comprising: logic, at least a portion of which is in hardware, the logic to receive an X2 timing information message over an X2 interface connection, the X2 timing information message to comprise macro cell timing information, the logic to select a set of small cell discontinuous reception (DRX) parameters based on the macro cell timing information and send an X2 radio resource control (RRC) configuration information message over the X2 interface connection to report the selected set of small cell DRX parameters.

Example 21 is the eNB of Example 20, the logic to select the set of small cell DRX parameters for a dually-connected user equipment (UE).

Example 22 is the eNB of Example 20, the logic to select one or more of the set of small cell DRX parameters to align a long DRX cycle of a small served by the eNB with a long DRX cycle of a serving macro cell of the dually-connected UE.

Example 23 is the eNB of Example 20, the logic to select one or more of the set of small cell DRX parameters to align a DRX ON duration of a small served by the eNB with a DRX ON duration of a serving macro cell of the dually-connected UE.

Example 24 is the eNB of Example 20, the logic to determine an inter-cell timing offset based on the macro cell timing information and select the set of small cell DRX parameters based on the inter-cell timing offset.

Example 25 is the eNB of Example 24, the logic to determine the inter-cell timing offset at a subframe level of granularity.

Example 26 is the eNB of Example 20, the logic to send a second X2 timing information message over the X2 interface connection, the second X2 timing information message to comprise small cell timing information for a small served by the eNB.

Example 27 is the eNB of Example 20, the logic to receive an X2 media access control (MAC) control element (CE) message over the X2 interface connection, the X2 MAC CE message to comprise a DRX command MAC CE.

Example 28 is the eNB of any of Examples 20 to 27, comprising: one or more radio frequency (RF) transceivers; and one or more RF antennas.

Example 29 is at least one non-transitory computer-readable storage medium comprising a set of wireless communication instructions that, in response to being executed at an evolved node B (eNB), cause the eNB to: select a set of macro cell discontinuous reception (DRX) parameters for dually-connected user equipment (UE); receive an X2 interface message comprising small cell timing information; determine a small cell DRX offset value based on the small cell timing information; and send a radio resource control (RRC) configuration message comprising the set of macro cell DRX parameters and the small cell DRX offset value.

Example 30 is the at least one non-transitory computer-readable storage medium of Example 29, the small cell timing information to comprise a small cell system frame number (SFN) and an absolute time comprising a start time of a small cell frame corresponding to the small cell SFN.

Example 31 is the at least one non-transitory computer-readable storage medium of Example 29, the small cell timing information to comprise a small cell system frame number (SFN), a small cell subframe number, and an absolute time comprising a start time of a small cell subframe within a small cell frame corresponding to the small cell SFN, the small cell subframe corresponding to the small cell subframe number.

Example 32 is the at least one non-transitory computer-readable storage medium of Example 29, the small cell DRX offset value to indicate an offset between a system timing of a small cell and a system timing of a macro cell served by the eNB.

Example 33 is the at least one non-transitory computer-readable storage medium of Example 29, comprising wireless communication instructions that, in response to being executed at the eNB, cause the eNB to determine the small cell DRX offset value at a level of granularity of less than one subframe.

Example 34 is the at least one non-transitory computer-readable storage medium of Example 29, the RRC configuration message to contain a RadioResourceConfigDedicated IE comprising the set of macro cell DRX parameters and to contain a small cell RRC configuration IE comprising the small cell DRX offset value.

Example 35 is the at least one non-transitory computer-readable storage medium of Example 34, the small cell RRC configuration IE to comprise a small cell DRX configuration IE that contains the small cell DRX offset value.

Example 36 is the at least one non-transitory computer-readable storage medium of Example 29, comprising wireless communication instructions that, in response to being executed at the eNB, cause the eNB to: send a DRX command media access control (MAC) control element (CE) to instruct the dually-connected UE to enter a DRX mode with respect a macro cell served by the eNB; and send an X2 MAC CE message to transfer the DRX command MAC CE over an X2 interface connection.

Example 37 is a wireless communication method, comprising: receiving, at an evolved node B (eNB), an X2 timing information message over an X2 interface connection, the X2 timing information message to comprise macro cell timing information; selecting, by processing circuitry of the eNB, a set of small cell discontinuous reception (DRX) parameters based on the macro cell timing information; and sending an X2 radio resource control (RRC) configuration information message over the X2 interface connection to report the selected set of small cell DRX parameters.

Example 38 is the wireless communication method of Example 37, comprising selecting the set of small cell DRX parameters for a dually-connected user equipment (UE).

Example 39 is the wireless communication method of Example 37, comprising selecting one or more of the set of small cell DRX parameters to align a long DRX cycle of a small served by the eNB with a long DRX cycle of a serving macro cell of the dually-connected UE.

Example 40 is the wireless communication method of Example 37, comprising selecting one or more of the set of small cell DRX parameters to align a DRX ON duration of a small served by the eNB with a DRX ON duration of a serving macro cell of the dually-connected UE.

Example 41 is the wireless communication method of Example 37, comprising: determining an inter-cell timing offset based on the macro cell timing information; and selecting the set of small cell DRX parameters based on the inter-cell timing offset.

Example 42 is the wireless communication method of Example 41, comprising determining the inter-cell timing offset at a subframe level of granularity.

Example 43 is the wireless communication method of Example 37, comprising sending a second X2 timing information message over the X2 interface connection, the second X2 timing information message to comprise small cell timing information for a small served by the eNB.

Example 44 is the wireless communication method of Example 37, comprising receiving an X2 media access control (MAC) control element (CE) message over the X2 interface connection, the X2 MAC CE message to comprise a DRX command MAC CE.

Example 45 is at least one non-transitory computer-readable storage medium comprising a set of instructions that, in response to being executed on a computing device, cause the computing device to perform a wireless communication method according to any of Examples 37 to 44.

Example 46 is an apparatus, comprising means for performing a wireless communication method according to any of Examples 37 to 44.

Example 47 is a system, comprising: an apparatus according to Example 46; at least one radio frequency (RF) transceiver; and at least one RF antenna.

Example 48 is a wireless communication method, comprising: receiving, at user equipment (UE), a radio resource control (RRC) configuration information message comprising a small cell RRC configuration information element (IE), the small cell RRC configuration IE to contain a small cell discontinuous reception (DRX) configuration IE comprising one or more inter-cell-coordinated small cell DRX parameters; determining, by processing circuitry of the UE, a start time for a small cell DRX cycle based on at least one of the one or more inter-cell-coordinated small cell DRX parameters; and initiating the small cell DRX cycle at the determined start time.

Example 49 is the wireless communication method of Example 48, the one or more intercell-coordinated small cell DRX parameters to comprise a small cell DRX offset value.

Example 50 is the wireless communication method of Example 49, the small cell DRX offset value to indicate a timing offset between a master cell group (MCG) for the UE and a secondary cell group (SCG) for the UE.

Example 51 is the wireless communication method of Example 50, the small cell DRX offset value to indicate the timing offset at a level of granularity no larger than one subframe.

Example 52 is the wireless communication method of Example 49, comprising determining the start time for the small cell DRX cycle based on the small cell DRX offset value.

Example 53 is the wireless communication method of Example 48, the small cell DRX configuration IE to comprise a set of small cell DRX parameters for controlling small cell DRX operations of the UE.

Example 54 is the wireless communication method of Example 53, the set of small cell DRX parameters to comprise one or more parameters selected to align a long DRX cycle of a serving small cell of the UE with a long DRX cycle of a serving macro cell of the UE.

Example 55 is the wireless communication method of Example 53, the set of small cell DRX parameters to comprise one or more parameters selected to align a DRX ON duration of a serving small cell of the UE with a DRX ON duration of a serving macro cell of the UE.

Example 56 is at least one non-transitory computer-readable storage medium comprising a set of instructions that, in response to being executed on a computing device, cause the computing device to perform a wireless communication method according to any of Examples 48 to 55.

Example 57 is an apparatus, comprising means for performing a wireless communication method according to any of Examples 48 to 55.

Example 58 is a system, comprising: an apparatus according to Example 57; at least one radio frequency (RF) transceiver; and at least one RF antenna.

Example 59 is the system of Example 58, comprising a touchscreen display.

Example 60 is at least one non-transitory computer-readable storage medium comprising a set of wireless communication instructions that, in response to being executed at an evolved node B (eNB), cause the eNB to: receive an X2 timing information message over an X2 interface connection, the X2 timing information message to comprise macro cell timing information; select a set of small cell discontinuous reception (DRX) parameters based on the macro cell timing information; and send an X2 radio resource control (RRC) configuration information message over the X2 interface connection to report the selected set of small cell DRX parameters.

Example 61 is the at least one non-transitory computer-readable storage medium of Example 60, comprising wireless communication instructions that, in response to being executed at the eNB, cause the eNB to select the set of small cell DRX parameters for a dually-connected user equipment (UE).

Example 62 is the at least one non-transitory computer-readable storage medium of Example 60, comprising wireless communication instructions that, in response to being executed at the eNB, cause the eNB to select one or more of the set of small cell DRX parameters to align a long DRX cycle of a small served by the eNB with a long DRX cycle of a serving macro cell of the dually-connected UE.

Example 63 is the at least one non-transitory computer-readable storage medium of Example 60, comprising wireless communication instructions that, in response to being executed at the eNB, cause the eNB to select one or more of the set of small cell DRX parameters to align a DRX ON duration of a small served by the eNB with a DRX ON duration of a serving macro cell of the dually-connected UE.

Example 64 is the at least one non-transitory computer-readable storage medium of Example 60, comprising wireless communication instructions that, in response to being executed at the eNB, cause the eNB to: determine an inter-cell timing offset based on the macro cell timing information; and select the set of small cell DRX parameters based on the inter-cell timing offset.

Example 65 is the at least one non-transitory computer-readable storage medium of Example 64, comprising wireless communication instructions that, in response to being executed at the eNB, cause the eNB to determine the inter-cell timing offset at a subframe level of granularity.

Example 66 is the at least one non-transitory computer-readable storage medium of Example 60, comprising wireless communication instructions that, in response to being executed at the eNB, cause the eNB to send a second X2 timing information message over the X2 interface connection, the second X2 timing information message to comprise small cell timing information for a small served by the eNB.

Example 67 is the at least one non-transitory computer-readable storage medium of Example 60, comprising wireless communication instructions that, in response to being executed at the eNB, cause the eNB to receive an X2 media access control (MAC) control element (CE) message over the X2 interface connection, the X2 MAC CE message to comprise a DRX command MAC CE.

Example 68 is at least one non-transitory computer-readable storage medium comprising a set of wireless communication instructions that, in response to being executed on user equipment (UE), cause the UE to: receive a radio resource control (RRC) configuration information message comprising a small cell RRC configuration information element (IE), the small cell RRC configuration IE to contain a small cell discontinuous reception (DRX) configuration IE comprising one or more inter-cell-coordinated small cell DRX parameters; determine a start time for a small cell DRX cycle based on at least one of the one or more inter-cell-coordinated small cell DRX parameters; and initiate the small cell DRX cycle at the determined start time.

Example 69 is the at least one non-transitory computer-readable storage medium of Example 68, the one or more intercell-coordinated small cell DRX parameters to comprise a small cell DRX offset value.

Example 70 is the at least one non-transitory computer-readable storage medium of Example 69, the small cell DRX offset value to indicate a timing offset between a master cell group (MCG) for the UE and a secondary cell group (SCG) for the UE.

Example 71 is the at least one non-transitory computer-readable storage medium of Example 70, the small cell DRX offset value to indicate the timing offset at a level of granularity no larger than one subframe.

Example 72 is the at least one non-transitory computer-readable storage medium of Example 69, comprising wireless communication instructions that, in response to being executed on the UE, cause the UE to determine the start time for the small cell DRX cycle based on the small cell DRX offset value.

Example 73 is the at least one non-transitory computer-readable storage medium of Example 68, the small cell DRX configuration IE to comprise a set of small cell DRX parameters for controlling small cell DRX operations of the UE.

Example 74 is the at least one non-transitory computer-readable storage medium of Example 73, the set of small cell DRX parameters to comprise one or more parameters selected to align a long DRX cycle of a serving small cell of the UE with a long DRX cycle of a serving macro cell of the UE.

Example 75 is the at least one non-transitory computer-readable storage medium of Example 73, the set of small cell DRX parameters to comprise one or more parameters selected to align a DRX ON duration of a serving small cell of the UE with a DRX ON duration of a serving macro cell of the UE.

Example 76 is a wireless communication method, comprising: selecting, by processing circuitry at an evolved node B (eNB), a set of macro cell discontinuous reception (DRX) parameters for dually-connected user equipment (UE); receiving an X2 interface message comprising small cell timing information; determining a small cell DRX offset value based on the small cell timing information; and sending a radio resource control (RRC) configuration message comprising the set of macro cell DRX parameters and the small cell DRX offset value.

Example 77 is the wireless communication method of Example 76, the small cell timing information to comprise a small cell system frame number (SFN) and an absolute time comprising a start time of a small cell frame corresponding to the small cell SFN.

Example 78 is the wireless communication method of Example 76, the small cell timing information to comprise a small cell system frame number (SFN), a small cell subframe number, and an absolute time comprising a start time of a small cell subframe within a small cell frame corresponding to the small cell SFN, the small cell subframe corresponding to the small cell subframe number.

Example 79 is the wireless communication method of Example 76, the small cell DRX offset value to indicate an offset between a system timing of a small cell and a system timing of a macro cell served by the eNB.

Example 80 is the wireless communication method of Example 76, comprising determining the small cell DRX offset value at a level of granularity of less than one subframe.

Example 81 is the wireless communication method of Example 76, the RRC configuration message to contain a RadioResourceConfigDedicated IE comprising the set of macro cell DRX parameters and to contain a small cell RRC configuration IE comprising the small cell DRX offset value.

Example 82 is the wireless communication method of Example 81, the small cell RRC configuration IE to comprise a small cell DRX configuration IE that contains the small cell DRX offset value.

Example 83 is the wireless communication method of Example 76, comprising: sending a DRX command media access control (MAC) control element (CE) to instruct the dually-connected UE to enter a DRX mode with respect a macro cell served by the eNB; and sending an X2 MAC CE message to transfer the DRX command MAC CE over an X2 interface connection.

Example 84 is at least one non-transitory computer-readable storage medium comprising a set of instructions that, in response to being executed on a computing device, cause the computing device to perform a wireless communication method according to any of Examples 76 to 83.

Example 85 is an apparatus, comprising means for performing a wireless communication method according to any of Examples 76 to 83.

Example 86 is a system, comprising: an apparatus according to Example 85; at least one radio frequency (RF) transceiver; and at least one RF antenna.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. User equipment (UE), comprising:
one or more radio frequency (RF) transceivers;
one or more RF antennas; and
logic, at least a portion of which is in hardware, the logic to receive a radio resource control (RRC) configuration information message comprising a small cell RRC configuration information element (IE), the small cell RRC configuration IE to contain a small cell discontinuous reception (DRX) configuration IE comprising one or more inter-cell-coordinated small cell DRX parameters to be applied by the UE during operation in a dually-connected mode according to which the UE is provided with concurrent data connectivity via a first data connection utilizing a first wireless communication frequency and a second data connection utilizing a second wireless communication frequency, the logic to determine a start time for a small cell DRX cycle based on at least one of the one or more inter-cell-coordinated small cell DRX parameters and initiate the small cell DRX cycle at the determined start time.

2. The UE of claim 1, the one or more intercell-coordinated small cell DRX parameters to comprise a small cell DRX offset value.

3. The UE of claim 2, the small cell DRX offset value to indicate a timing offset between a master cell group (MCG) for the UE and a secondary cell group (SCG) for the UE.

4. The UE of claim 3, the small cell DRX offset value to indicate the timing offset at a level of granularity no larger than one subframe.

5. The UE of claim 2, the logic to determine the start time for the small cell DRX cycle based on the small cell DRX offset value.

6. The UE of claim 1, the small cell DRX configuration IE to comprise a set of small cell DRX parameters for controlling small cell DRX operations of the UE.

7. The UE of claim 6, the set of small cell DRX parameters to comprise one or more parameters selected to align a long DRX cycle of a serving small cell of the UE with a long DRX cycle of a serving macro cell of the UE.

8. The UE of claim 6, the set of small cell DRX parameters to comprise one or more parameters selected to align a DRX ON duration of a serving small cell of the UE with a DRX ON duration of a serving macro cell of the UE.

9. The UE of claim 1, comprising a touchscreen display.

10. An evolved node B (eNB), comprising:
at least one radio frequency (RF) transceiver;
at least one RF antenna; and
logic, at least a portion of which is in hardware, the logic to select a set of macro cell discontinuous reception (DRX) parameters for user equipment (UE) possessing concurrent data connectivity via a first data connection utilizing a first wireless communication frequency and a second data connection utilizing a second wireless communication frequency, receive an X2 interface message comprising small cell timing information, determine a small cell DRX offset value based on the small cell timing information, and send a radio resource control (RRC) configuration message comprising the set of macro cell DRX parameters and the small cell DRX offset value.

11. The eNB of claim 10, the small cell timing information to comprise a small cell system frame number (SFN) and an absolute time comprising a start time of a small cell frame corresponding to the small cell SFN.

12. The eNB of claim 10, the small cell timing information to comprise a small cell system frame number (SFN), a small cell subframe number, and an absolute time comprising a start time of a small cell subframe within a small cell frame corresponding to the small cell SFN, the small cell subframe corresponding to the small cell subframe number.

13. The eNB of claim 10, the small cell DRX offset value to indicate an offset between a system timing of a small cell and a system timing of a macro cell served by the eNB.

14. The eNB of claim 10, the logic to determine the small cell DRX offset value at a level of granularity of less than one subframe.

15. The eNB of claim 10, the RRC configuration message to contain a RadioResourceConfigDedicated IE comprising the set of macro cell DRX parameters and to contain a small cell RRC configuration IE comprising the small cell DRX offset value.

16. The eNB of claim 15, the small cell RRC configuration IE to comprise a small cell DRX configuration IE that contains the small cell DRX offset value.

17. The eNB of claim 10, the logic to send a DRX command media access control (MAC) control element (CE) to instruct the UE to enter a DRX mode with respect a macro cell served by the eNB and send an X2 MAC CE message to transfer the DRX command MAC CE over an X2 interface connection.

18. An evolved node B (eNB), comprising:
one or more radio frequency (RF) transceivers;
one or more RF antennas; and
logic, at least a portion of which is in hardware, the logic to:
receive an X2 timing information message over an X2 interface connection, the X2 timing information message to comprise macro cell timing information;
based on the macro cell timing information, select a set of small cell discontinuous reception (DRX) parameters for user equipment (UE) possessing concurrent data connectivity via a first data connection utilizing a first wireless communication frequency and a second data connection utilizing a second wireless communication frequency; and
send an X2 radio resource control (RRC) configuration information message over the X2 interface connection to report the selected set of small cell DRX parameters.

19. The eNB of claim 18, the logic to receive an X2 media access control (MAC) control element (CE) message over the X2 interface connection, the X2 MAC CE message to comprise a DRX command MAC CE.

20. The eNB of claim 18, the logic to select one or more of the set of small cell DRX parameters to align a long DRX cycle of a small served by the eNB with a long DRX cycle of a serving macro cell of the UE.

21. The eNB of claim 18, the logic to select one or more of the set of small cell DRX parameters to align a DRX ON duration of a small served by the eNB with a DRX ON duration of a serving macro cell of the UE.

22. The eNB of claim 18, the logic to determine an inter-cell timing offset based on the macro cell timing information and select the set of small cell DRX parameters based on the inter-cell timing offset.

23. The eNB of claim 22, the logic to determine the inter-cell timing offset at a subframe level of granularity.

24. The eNB of claim 18, the logic to send a second X2 timing information message over the X2 interface connection, the second X2 timing information message to comprise small cell timing information for a small served by the eNB.

* * * * *